(12) United States Patent
Garrison et al.

(10) Patent No.: US 9,997,979 B1
(45) Date of Patent: Jun. 12, 2018

(54) MAGNETIC KINETIC PROPULSION MOTOR APPARATUS AND METHOD

(71) Applicants: Roy Lee Garrison, Cantonment, FL (US); Charles Paul McNemar, Gulf Breeze, FL (US)

(72) Inventors: Roy Lee Garrison, Cantonment, FL (US); Charles Paul McNemar, Gulf Breeze, FL (US)

( * ) Notice: Subject to any disclaimer, the term of this patent is extended or adjusted under 35 U.S.C. 154(b) by 456 days.

(21) Appl. No.: 14/645,019

(22) Filed: Mar. 11, 2015

Related U.S. Application Data (60) Provisional application No. 61/950,902, filed on Mar. 11, 2014.

(51) Int. Cl.
| | | |
|---|---|---|
| *B64D 27/24* | (2006.01) | |
| *H02K 53/00* | (2006.01) | |
| *H02K 35/02* | (2006.01) | |
| *H02K 11/00* | (2016.01) | |
| *H02K 7/116* | (2006.01) | |
| *H02K 25/00* | (2006.01) | |

(52) U.S. Cl.
CPC ......... *H02K 11/0073* (2013.01); *B64D 27/24* (2013.01); *H02K 7/116* (2013.01); *H02K 11/0021* (2013.01); *H02K 53/00* (2013.01); *H02K 25/00* (2013.01); *H02K 35/02* (2013.01)

(58) Field of Classification Search
CPC ................................ H02K 25/00; B64D 27/24
USPC ....................................................... 310/68 B
See application file for complete search history.

(56) References Cited

U.S. PATENT DOCUMENTS

| | | | | |
|---|---|---|---|---|
| 3,563,497 A | * | 2/1971 | Holmes ................... | B64C 27/02 244/12.3 |
| 3,983,426 A | * | 9/1976 | Kilmer ................... | H02K 25/00 310/46 |
| 4,025,831 A | * | 5/1977 | Webb ..................... | H02K 29/06 318/400.37 |
| 4,459,087 A | * | 7/1984 | Barge ...................... | F01P 5/04 123/41.12 |

(Continued)

*Primary Examiner* — Burton Mullins
(74) *Attorney, Agent, or Firm* — J. Nevin Shaffer, Jr.

(57) ABSTRACT

A magnetic kinetic propulsion motor apparatus and method includes a shaft with a first two ended rotational blade attached at a midpoint of the two ended rotational blade to the shaft. A proximity magnetic sensor is connected at both ends of the two ended rotational blade. A stationary housing surrounds the shaft and the first two ended rotational blade. Several self-aligning repulsion electro-magnets are connected to the stationary housing and a proximity switch is connected with each of the self-aligning repulsion electro-magnets. An electronic ignition distributor is connected to each proximity switch connected with the self-aligning repulsion electro-magnets and a battery is connected to the electronic ignition distributor. A generator is connected to the shaft, the electronic ignition distributor and the battery where in response to the proximity magnetic sensor on the ends of the first two ended rotational blade detecting a proximity switch connected with a self-aligning repulsion electro-magnet the electronic ignition distributer sends power to the self-aligning repulsion electro-magnet which generates repulsive magnetic force on the proximity magnetic sensor at the ends of the first two ended rotational blade.

18 Claims, 5 Drawing Sheets

(56) References Cited

U.S. PATENT DOCUMENTS

| | | | | |
|---|---|---|---|---|
| 5,227,684 A | * | 7/1993 | Riley | H02K 25/00 |
| | | | | 310/62 |
| 6,388,346 B1 | * | 5/2002 | Lopatinsky | F04D 25/066 |
| | | | | 310/114 |
| 7,410,123 B2 | * | 8/2008 | Nunnally | B64C 27/20 |
| | | | | 244/23 C |
| 7,466,044 B2 | * | 12/2008 | Elmaleh | H02K 53/00 |
| | | | | 180/65.1 |
| 8,350,502 B2 | * | 1/2013 | Rabal | H02K 25/00 |
| | | | | 310/113 |
| 9,634,551 B2 | * | 4/2017 | Rabal | H02J 7/0068 |
| 2006/0016929 A1 | * | 1/2006 | Mohr | B64C 11/001 |
| | | | | 244/12.2 |
| 2008/0174211 A1 | * | 7/2008 | Liu | H02K 53/00 |
| | | | | 310/67 R |

* cited by examiner

MAGNETIC KINETIC PROPULSION MOTOR APPARATUS AND METHOD

CROSS REFERENCE TO RELATED APPLICATION

This application claims the benefit of previously filed U.S. provisional patent application No. 61/950,902 filed Mar. 11, 2014 for a "Magnetic Kinetic Propulsion Motor Apparatus and Method". The Applicants hereby claim the benefit of this provisional application under 35 U.S.C. § 119. The entire content of this provisional application is incorporated herein by this reference.

FIELD OF THE INVENTION

This invention relates to a magnetic kinetic propulsion motor. In particular, in accordance with one embodiment, the invention relates to a magnetic kinetic propulsion motor apparatus consisting of a shaft with a first two ended rotational blade attached at a midpoint of the two ended rotational blade to the shaft. A proximity magnetic sensor is connected at both ends of the two ended rotational blade. A stationary housing surrounds the shaft and the first two ended rotational blade. Several self-aligning repulsion electro-magnets are connected to the stationary housing and a proximity switch is connected with each of the self-aligning repulsion electro-magnets. An electronic ignition distributor is connected to each proximity switch connected with the self-aligning repulsion electro-magnets and a battery is connected to the electronic ignition distributor. A generator is connected to the shaft, the electronic ignition distributor and the battery where in response to the proximity magnetic sensor on the ends of the first two ended rotational blade detecting a proximity switch connected with a self-aligning repulsion electro-magnet the electronic ignition distributer sends power to the self-aligning repulsion electro-magnet which generates repulsive magnetic force on the proximity magnetic sensor at the ends of the first two ended rotational blade.

BACKGROUND OF THE INVENTION

A problem exists and has existed for a long time with regard to the need for an efficient and clean motor for individual and commercial use. Today's motors use large amounts of energy and in the process create harmful by products that adversely affect the environment. For over one hundred years all electric motors have been by their original design limited in their capacity to deliver leverage gains that are typically produced and derived from the magnetic attraction forces reacting between the fields and armature. Three main technology shortfall issues crippling the efficiency of these magnetic forces are the short distance between the center-line of the main shaft and the outer shell of the armature; the high magnetic induction resistance created by the prior art designs; and the resultant horsepower produced per pound of weight are very small and hinder deployment in many useful areas.

Thus, there is a need in the art for an electrically powered motor that is highly efficient and powerful such that the motor may be employed in many useful areas.

It therefore is an object of this invention to provide a magnetic kinetic propulsion motor that is efficient, powerful and robust.

SUMMARY OF THE INVENTION

Accordingly, the magnetic kinetic propulsion motor of the present invention, according to one embodiment, includes a shaft with a first two ended rotational blade attached at a midpoint of the two ended rotational blade to the shaft. A proximity magnetic sensor is connected at both ends of the two ended rotational blade. A stationary housing surrounds the shaft and the first two ended rotational blade. Several self-aligning repulsion electro-magnets are connected to the stationary housing and a proximity switch is connected with each of the self-aligning repulsion electro-magnets. An electronic ignition distributor is connected to each proximity switch connected with the self-aligning repulsion electro-magnets and a battery is connected to the electronic ignition distributor. A generator is connected to the shaft, the electronic ignition distributor and the battery where in response to the proximity magnetic sensor on the ends of the first two ended rotational blade detecting a proximity switch connected with a self-aligning repulsion electro-magnet the electronic ignition distributer sends power to the self-aligning repulsion electro-magnet which generates repulsive magnetic force on the proximity magnetic sensor at the ends of the first two ended rotational blade.

All terms used herein are given their common meaning so that, for example, "rotational blade" identifies and describes a blade that once attached to a shaft is freely rotatable by the shaft.

According to another aspect, the invention further includes a second two ended rotational blade connected at a midpoint of the second two ended rotational blade to the shaft and at right angle to the first two ended rotational blade where a proximity magnetic sensor is connected at both ends of the second two ended rotational shaft.

In another aspect, the several self-aligning repulsion electro-magnets include a non-magnetic housing, several wire wrapped iron rods are located within the non-magnetic housing in spaced apart relation where the plurality of wire wrapped iron rods surround a center cavity within the non-magnetic housing, and a magnetic square rod is located within the center cavity where the magnetic square rod is free to move to align with magnetic forces. In one aspect, there are seven wire wrapped iron rods in the non-magnetic housing.

One aspect includes a gear box connected to the shaft and a lower two ended rotational blade attached at a midpoint of the lower two ended rotational blade to the shaft such that the gear box is between the first two ended rotational blade and the lower two ended rotational blade. In another aspect, the gear box reverses the direction of the lower two ended rotational blade in relation to the first two ended rotational blade.

In a further aspect, the housing is circular such that each of the several self-aligning repulsion electro-magnets is equidistant from the shaft.

One aspect includes a mounting post connected with the stationary housing and in another aspect, the housing includes two open ends.

According to another embodiment of the invention, a magnetic kinetic propulsion motor apparatus includes a shaft with a first two ended rotational blade attached at a midpoint of the two ended rotational blade to the shaft. A proximity magnetic sensor is attached to both ends of the two ended rotational blade. A stationary housing surrounds the shaft and the first two ended rotational blade where the housing is circular. Several self-aligning repulsion electro-magnets are connected to the stationary housing such that each of the plurality of self-aligning repulsion electro-magnets is equidistant from the shaft. A proximity switch is connected with each of the self-aligning repulsion electro-magnets. An electronic ignition distributor is connected to each proximity switch connected with the self-aligning repulsion electromagnets and a battery is connected to the electronic ignition distributor. A generator is connected to the shaft, the electronic ignition distributor and the battery where in response to the proximity magnetic sensor on the ends of the first two ended rotational blade detecting a proximity switch connected with a self-aligning repulsion electro-magnet the electronic ignition distributer sends power to the self-aligning repulsion electro-magnet which generates repulsive magnetic force on the proximity magnetic sensor at the ends of the first two ended rotational blade. A gear box is connected to the shaft and a lower two ended rotational blade is attached at a midpoint of the lower two ended rotational blade to the shaft such that the gear box is between the first two ended rotational blade and the lower two ended rotational blade.

One aspect of this invention includes a second two ended rotational blade connected at a midpoint of the second two ended rotational blade to the shaft and at right angle to the first two ended rotational blade and a proximity magnetic sensor is connected at both ends of the second two ended rotational shaft.

In another aspect, the self-aligning repulsion electromagnets include a non-magnetic housing and several wire wrapped iron rods are located within the non-magnetic housing in spaced apart relation. The several wire wrapped iron rods surround a center cavity within the non-magnetic housing, and a magnetic square rod is located within the center cavity where the magnetic square rod is free to move to align with magnetic forces. In further aspect, there are seven wire wrapped iron rods in the housing.

In one aspect, the gear box reverses the direction of the lower two ended rotational blade in relation to the first two ended rotational blade. In another aspect, the housing includes two open ends. In a further aspect, a mounting post is connected with the stationary housing. In another aspect, there are thirty-six equally spaced self-aligning repulsion electro-magnets connected to the stationary housing.

According to another embodiment of the invention, a magnetic kinetic propulsion motor method consists of:
a. providing a shaft; a first two ended rotational blade attached at a midpoint of the two ended rotational blade to the shaft; a proximity magnetic sensor at both ends of the two ended rotational blade; a stationary housing surrounding the shaft and the first two ended rotational blade; several self-aligning repulsion electro-magnets connected to the stationary housing; a proximity switch connected with each of the self-aligning repulsion electro-magnets; an electronic ignition distributor connected to each proximity switch connected with the self-aligning repulsion electro-magnets; a battery connected to the electronic ignition distributor; and a generator connected to the shaft, the electronic ignition distributor and the battery where in response to the proximity magnetic sensor on the ends of the first two ended rotational blade detecting a proximity switch connected with a self-aligning repulsion electro-magnet the electronic ignition distributer sends power to the self-aligning repulsion electro-magnet which generates repulsive magnetic force on the proximity magnetic sensor at the ends of the first two ended rotational blade; and
b. operating the battery to power the electronic ignition distributer.

In one aspect, the method further includes providing a second two ended rotational blade connected at a midpoint of the second two ended rotational blade to the shaft and at right angle to the first two ended rotational blade where a proximity magnetic sensor is connected at both ends of the second two ended rotational shaft.

In another aspect, the method further includes providing a gear box connected to the shaft and a lower two ended rotational blade attached at a midpoint of the lower two ended rotational blade to the shaft such that the gear box is between the first two ended rotational blade and the lower two ended rotational blade.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

A preferred embodiment of the present invention is illustrated by way of example in FIGS. 1-5. With specific reference to FIGS. 1A and 1B, magnetic kinetic propulsion motor 10 includes a shaft 12. A first two ended rotational blade 14 is connected at a midpoint to the shaft 12. By "at a midpoint" it is meant that the connection with shaft 12 results in the shaft 12 being centered in-between the two ends of the first two ended rotational blade 14. A proximity magnetic sensor 16 is located at both ends of the first two ended rotational blade 14. Proximity magnetic sensor 16 is a proximity sensor as known in the art that signals the presence of a switch, for example. It is magnetic as well and thus reacts to magnetic forces of attraction and repulsion. Stationary housing 18 surrounds the shaft 12 and the first two ended rotational blade 14. By "stationary" it is understood that housing 18 does not rotate and holds all other elements connected to it in fixed relation to it. In one aspect the housing is circular in shape as illustrated and in another aspect the stationary housing 18 includes open ends 20.

Figure 2A:
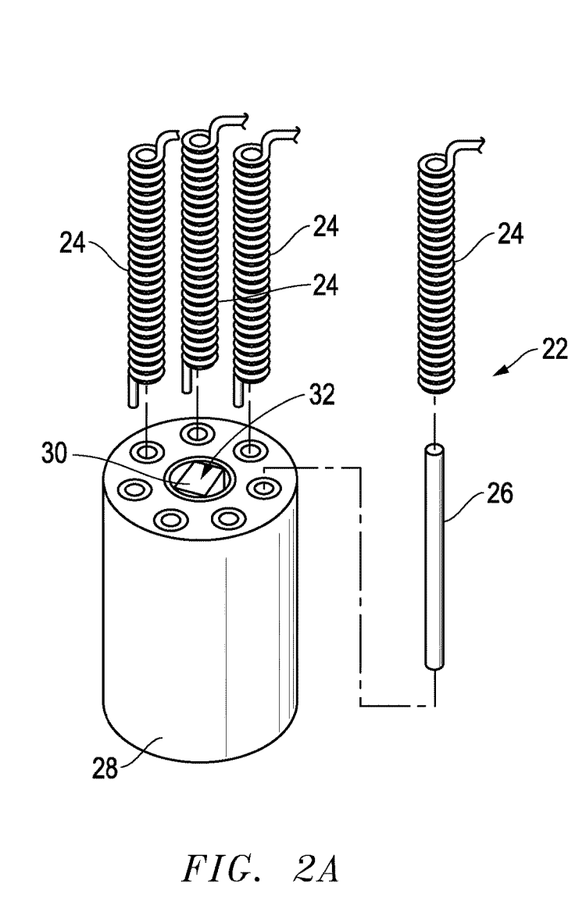
FIG. 2A is an exploded view of the elements of the self-aligning repulsion electro-magnets of the invention of FIG. 1.
Figure 2B:
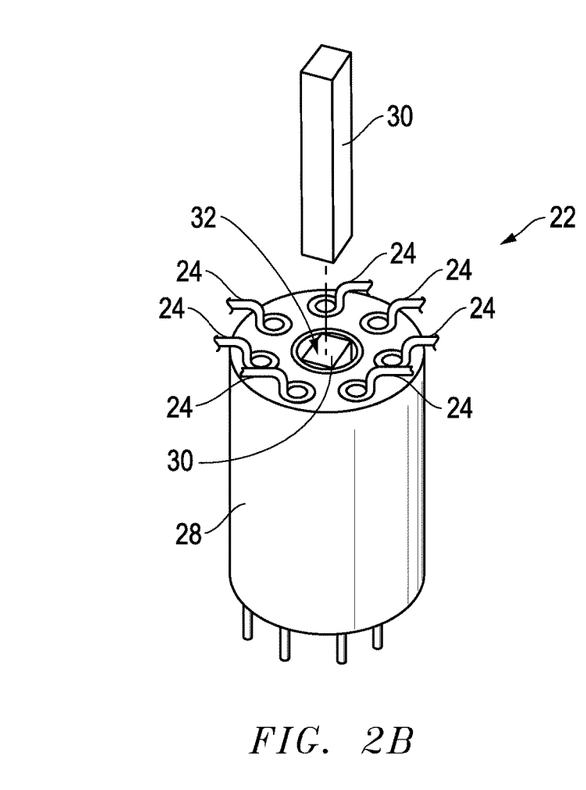
FIG. 2B is an exploded view of the elements of FIG. 2A showing the magnetic square rod in position for insertion to the housing.

Self-aligning repulsion electro-magnets 22 are connected to stationary housing 18. Referring to FIGS. 2A and 2B self-aligning repulsion electro-magnets 22 include wire 24 wrapped around iron rod 26 as illustrated. Thereafter, wire wrapped iron rods 26 are inserted into position in non-metallic housing 28. In one aspect an uneven number of wrapped iron rods 26 are spaced equidistant from each other inside the non-metallic housing 28 in a circular pattern as shown. In one aspect, the Applicants have found seven wire wrapped rods 26 are most efficient. Further, magnetic square rod 30, as shown in FIG. 2B, is located within a center cavity 32 of non-metallic housing 28 where the magnetic square rod 30 is free to move to align with magnetic forces.

Referring again to FIG. 1B, in one aspect of the invention a second two ended rotational blade 34 is provided and is connected at a midpoint of the second two ended rotational blade 34 to the shaft 12 as is the first two ended rotational blade 14 as described above. Further, the second two ended rotational blade 34 is connected at a right angle to the first two ended rotational blade 14 as shown such the ends of the blades are spaced apart equally from each other. Further, as with the first two ended rotational blade 14, a proximity magnetic sensor 16 is connected at both ends of the second two ended rotational shaft 34.

Figure 1A:
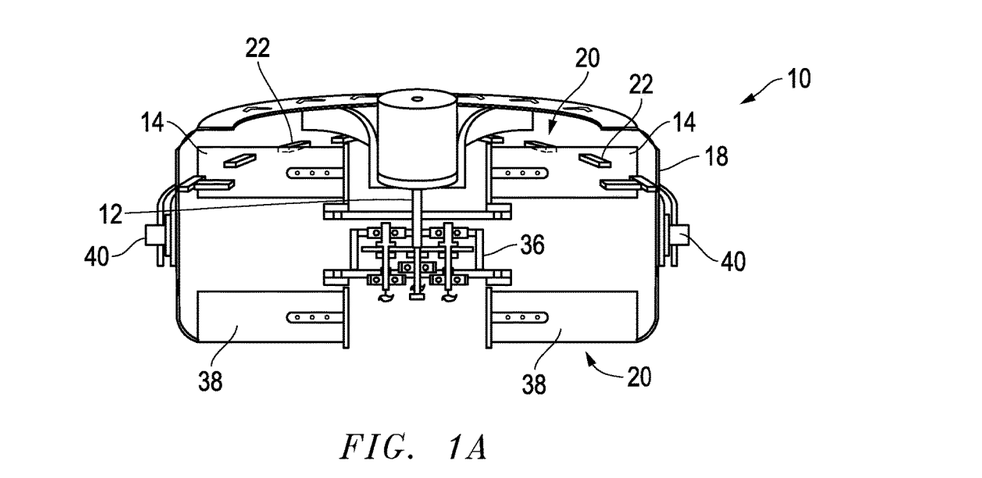
FIG. 1A is a side cut away view of the magnetic kinetic propulsion motor according to one embodiment.

Referring to FIG. 1A, in one aspect, a gear box 36 connected to shaft 12 and a lower two ended rotational blade 38 attached at a midpoint of the lower two ended rotational blade 38, as described above with regard to the other blades, to the shaft 12 such that the gear box 36 is between the first two ended rotational blade 14, and the second two ended rotational blade 34 when present, and the lower two ended rotational blade 38. In one aspect the gear box 36 reverses the direction of the lower two ended rotational blade 38 in relation to the direction of rotation of the first (and second if present) two ended rotational blade 14.

Figure 1B:
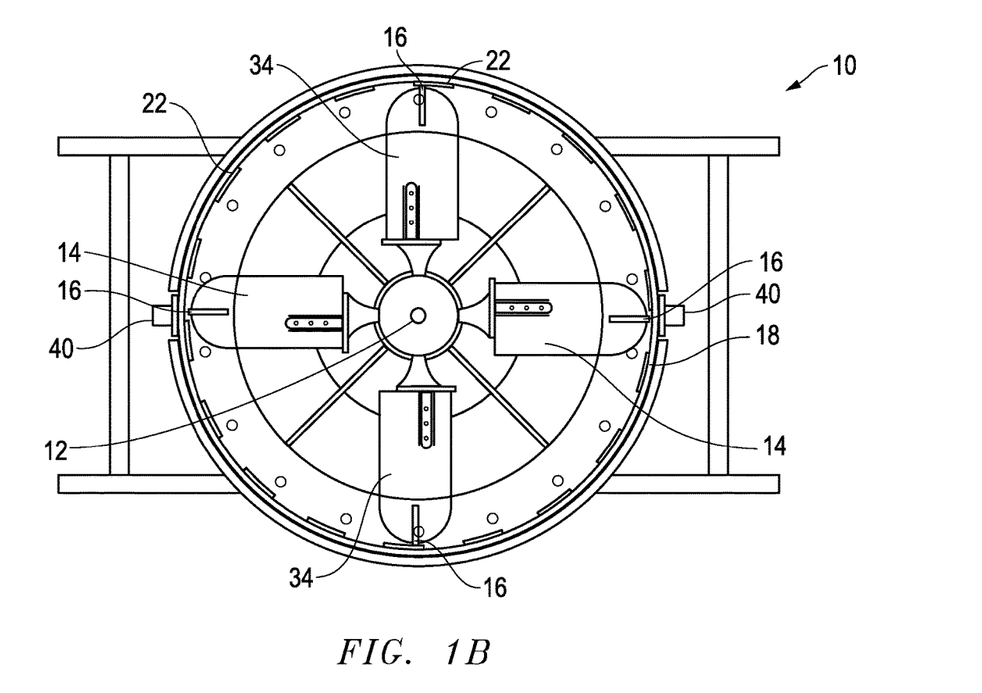
FIG. 1B is a top view of the apparatus of FIG. 1.

FIGS. 1A and 1B also show mounting post 40 connected with stationary housing 18. Mounting post 40 allows the entire stationary housing 18 to be moved and mounted as desired as illustrated with reference to FIG. 5 where the magnetic kinetic propulsion motor 10 is shown in a pair of motors 10 connected to wings 42 of a plane 44.

Figure 3:
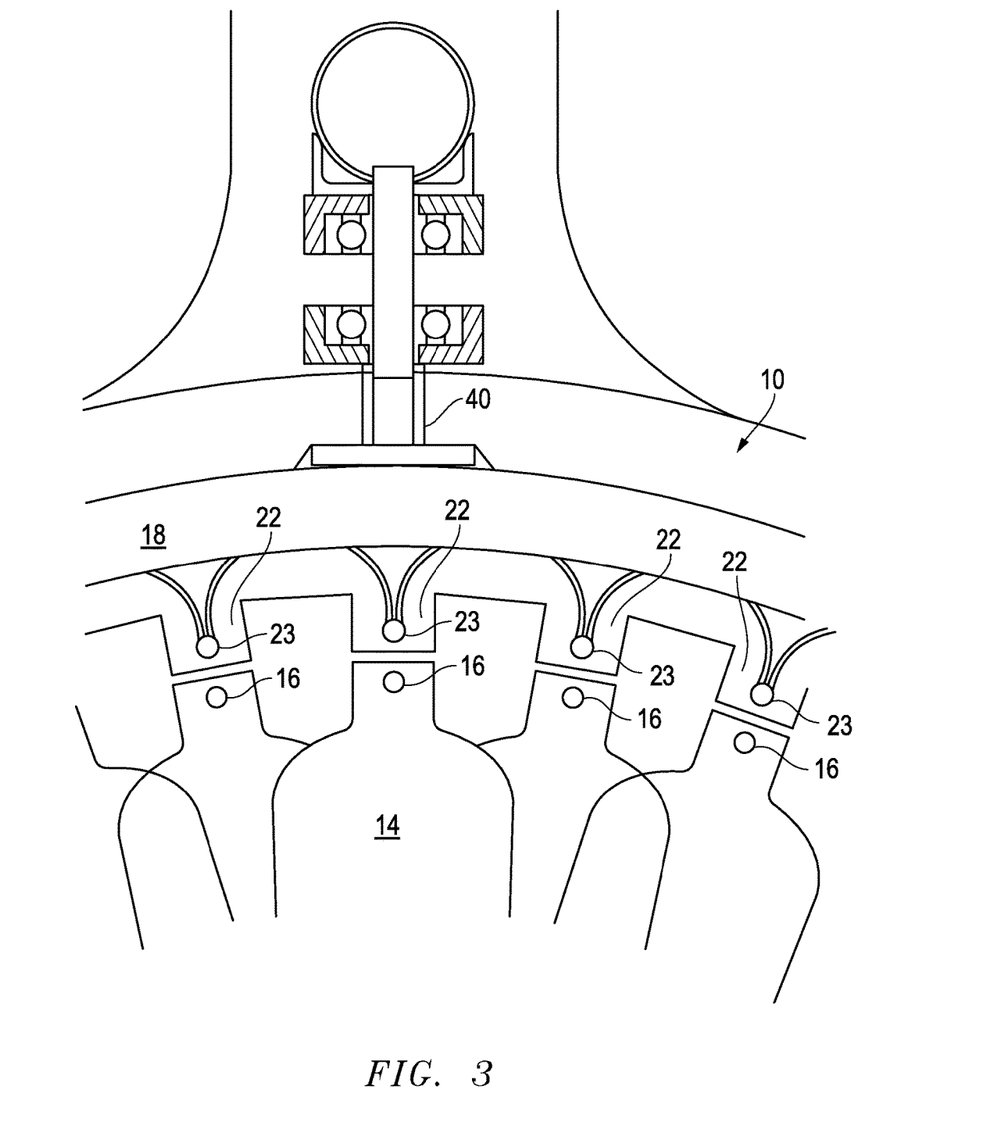
FIG. 3 is a close up view of the apparatus shown in FIG. 1B showing the relationship of the self-aligning repulsion electro-magnets with its proximity switch to the proximity magnetic sensor at the end of the rotational blade.

Referring now to FIG. 3, a close up of the structure showing the spacing and alignment of the self-aligning repulsion electro-magnets 22 with regard to one end of the first or second two ended rotational blades 14 and 34. As can be more clearly seen in this FIG. 3, each self-aligning repulsion electro-magnet 22 includes a proximity switch 23. In one aspect there are eighteen self-aligning repulsion electro-magnets 22 and in a preferred aspect there are thirty-six as Applicants have found that to be a most useful number in most situations.

Figure 4:
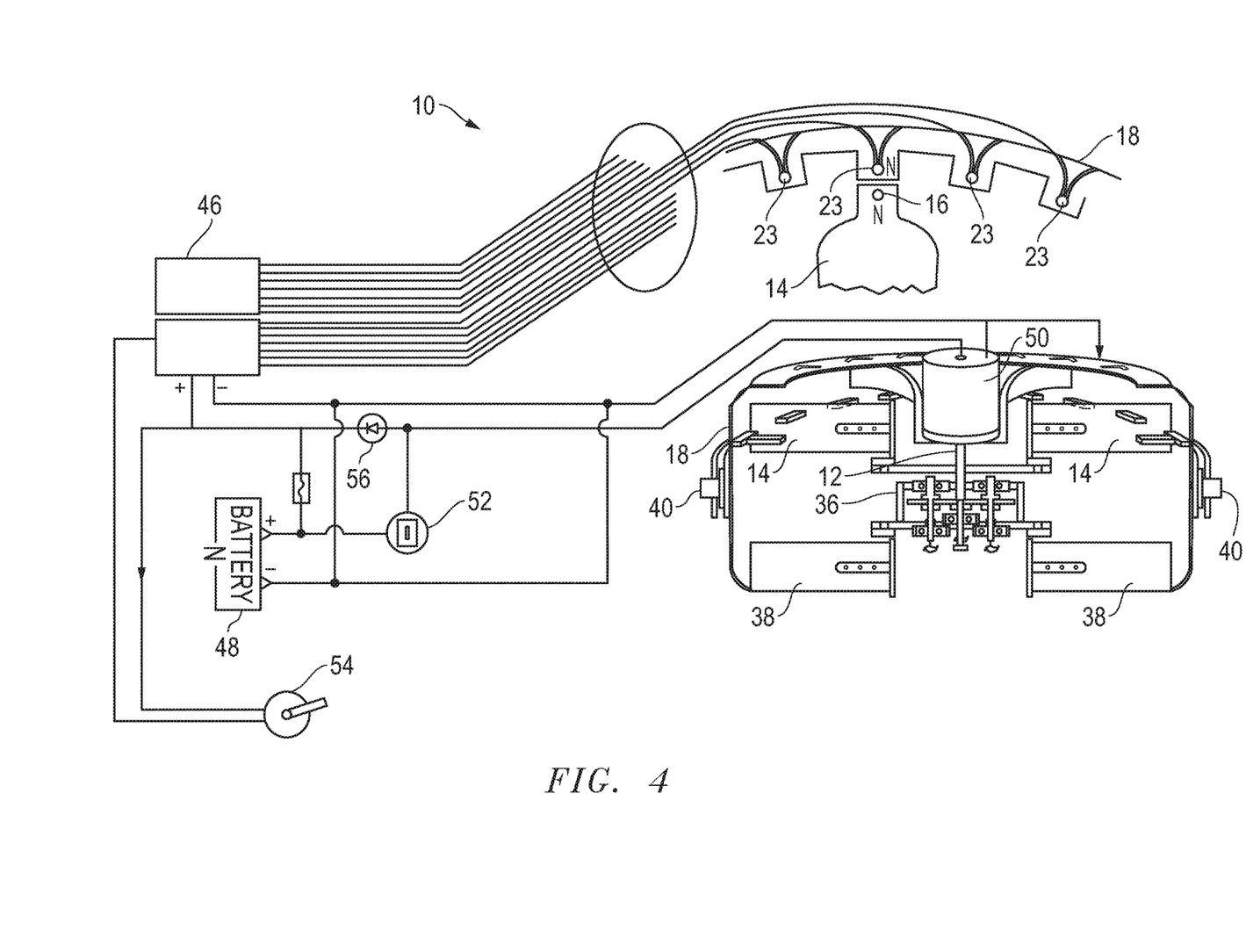
FIG. 4 is a schematic diagram illustrating the connection of the battery, the electronic ignition distributor and the generator.
Figure 5:
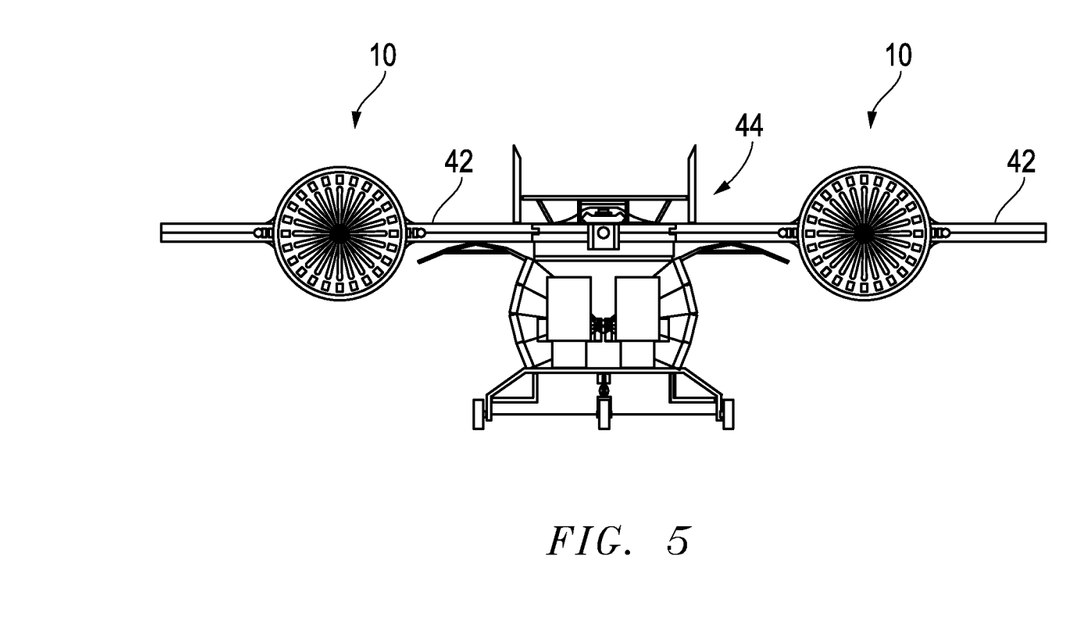
FIG. 5 is a front view illustrating the apparatus of the invention in place on an airplane.

FIG. 4 illustrates other important elements of the apparatus including an electronic ignition distributor 46 connected to each proximity switch 23 connected with the self-aligning repulsion electro-magnets 22. A battery 48 is connected to the electronic ignition distributor 46. Also, a generator 50 is connected to the shaft 12, the electronic ignition distributor 46 and the battery 48 where in response to a signal from the proximity magnetic sensor 16 on the ends of the first two ended rotational blade 14 (and second two ended rotational blade 34 when present) detecting a proximity switch 23 connected with a self-aligning repulsion electro-magnet 22 the electronic ignition distributor 46 sends power to the self-aligning repulsion electro-magnet 22 which generates repulsive magnetic force on the proximity magnetic sensor 16 at the ends of the first and second two ended rotational blades 14 and 34. This occurs simultaneously at both ends of the rotational blades 14 and 34 as both ends will be in the same position with a self-aligning repulsion electro-magnet 22 at the same time.

FIG. 4 schematics also show start button 52 and on-off switch 54 connected as shown for operation of the magnetic kinetic propulsion motor 10 according to one aspect. Diode 56 allows current to flow in the direction of the arrow only and allows any current developed by generator 50 to charge the electronic ignition distributor 50.

By way of further explanation, the mechanical and electrical design of the invention allows for leverage and high speed switching to multiply gains in magnetic repulsion force from that electric supply and repulsion force generated by a combination of electro-magnetics interacting inside a sustained self tuning permanent magnetic field. The sustained field provides a means for precision mechanical balance and link/leverage gain for the invention to generate additional force from high speed magnetic repulsion being sustained inside a self tuned permanent circular magnet field. This repulsion motor configuration is able to mechanically multiply the forces produced by the short timing burst of electrical power used to power the self-aligning repulsion electro-magnets that produce the repulsion force being applied to outer rotating blades. As the self-aligning repulsion electro-magnets are triggered each self-aligning repulsion electro-magnet provides the repulsion force against the curved permanent magnetic tips ends and proximity magnetic sensor of the rotational blade ends. The distance from the fixed magnetic tip ends of the blades provide repulsion force against the self-aligning repulsion electro-magnets generated force as/when triggered. The repulsion continues step by step each time it is triggered by the approaching two ended rotational blades with the proximity magnetic sensor's magnetic field where at such time the electric current is then applied to the responding self-aligning repulsion electro-magnets.

The cycle continues and sustains rotational motion as the electrical trigger allows electric current to be applied to the each/next self-aligning repulsion electro-magnets as the magnetic tips trigger "proximity switching" during its rotation at the switching location located for and at each of the repulsion coils during the 360 degrees of rotation.

The forces generated by the repulsion are able to produce a magnetic acceleration and gain rotational RPM due to the switching effect and continuous supply of electric current supplied from the attached starter/generator.

A power throttle control is utilized to regulate voltage and current allowed to flow to each self-aligning repulsion electro-magnet only during the triggered exact timing and degrees duration period of the rotating blades.

By way of the magnetic triggering of the repulsion forces produced by a very fast rotating opposing magnet field between the ends of the blades and stationary self-aligning repulsion electro-magnets mounted inside the motor housing torque and force are passed from the rotational blades to the center rotation main shaft as the electric current is applied to the self-aligning repulsion electro-magnets during the trigger cycle timing due to the starter/generation system which is connected to the main shaft.

By the invention's accelerating RPM rotations and length of the extended two ended rotational blades providing leverage and gains to the center shaft, the kinetic energy RPM gains and effluence obtained from the invention's rotating blades and high speed triggering of self-aligning repulsion electro-magnets at exactly the needed duration of electric current flow for each step process of the self-aligning repulsion electro-magnets.

The present motor provides safe and clean working force advanced beyond the need for a traditional combustion process. Among other things, the combination of the elements of the invention as described herein enable the invention to function as a ultra high efficient repulsion powered motor.

Applicants have found that the present invention does reduce the need for conventional fuels and provides the environmental benefits of zero carbon footprint. The present invention is a non conventional fuel motion powered by the electrical energy first supplied by the starter battery, where the start cycle will allow for the rotations of the turning rotational mass time enough during the starting cycle to start the electric power generation cycle and continue to speed up the rotations. This motor provides the ability to perform work as well as very long range flight by providing the first new motor invention in over 100 years.

And by way of continued description and explanation, the present invention is an ultra efficient and clean repulsion motor which generates its turning force as magnetic trigger switches connect self generated power for only a few millisecond time between rotational points. This electrical configuration provides the electrical current necessary to continue and sustain the repulsion cycle due to the high speed switching and is beyond the performance scope of all other electric motors.

The current supplied by the DC starter generator is switched on and off as the rotation continues around the 360 degrees rotation and continues to produce additional current as magnetic repulsion forces applied to the ends of the blades are multiplied at the main shaft due to the leverage gains from the ends to the shaft center. The motor starts its operation as DC power is turned on to the starter/generator and allowed to rev up the rpm to around 1000 revolutions per minute. At this revolution speed the rotational mass will continue to spin the extended propulsion blades after the DC supply flowing from the starting batter is turned off. The kinetic energy forces allow the continued spin until the generation cycle of the DC starter generator convert from being driven by electrical current to generating electrical current sufficient enough to continue the rotational process. There is a depletion of magnetic forces, however, which over long periods of time will weaken and allow the sustaining self tuning core of the repulsion magnetic fields to no longer provide repulsion forces able to provide repulsion leverage and necessary velocity to generate electric current necessary to power and control the force of the rotational benefits.

By way of review, shaft 12 connects to first two ended rotational blade 14, and second two ended rotational blade 34 when present, and generator 50. The rotational blades 14 and 34 supplies the leverage gains to the self-aligning repulsion electromagnets 22 when proximity magnetic sensors 16 come into proximity of proximity switches 23 and trigger the electric pulse that is supplied and throttle speed controlled from the Electronic Ignition Distributor 46 which is in turn powered by the battery 48.

The stationary housing 18 of the motor contains the rotation parts and its magnetic electronic sensing components that are held in place by the non electrically conductive inside stationary housing 18.

Proximity sensors located at every self-aligning repulsion electromagnet 22 conduct current flow and speed controlling voltage amounts supplied from the electronic ignition distributor 46. The proximity magnetic sensors 16 are mounted and fixed into the rotational blade ends that in turn are rotating shaft 12 as the repulsion continues the repulsion force around the 360 degrees of the housing 18. The self-aligning repulsion electromagnets 22 are located at fixed positions around stationary housing 18 and are mechanically held in place by the housing and supply the instant forces that in turn thrust the ends of the rotational blades forward into the next proceeding range of proximity switch and proximity sensor that in turn continues the process of triggering the voltage and current supply from the electronic Ignition distributor 46 and supplying the electrical energy to each self-aligning repulsion electromagnet 22 in controlled amounts of power supplied from battery 48. The motor 10 operation maintains operational power itself from generator 50 that operates 100% duty cycle while the self-aligning repulsion electromagnets 22 are triggered approximately 30% of the same time base relationship thereby the charging rate is beyond consumption and more efficient than all other electric motor design.

The motor 10 is held in place by mounting posts 40 that allow for rotational positioning of the motor. Wire 24 is very high grade single strand silver coated copper. DC Generation unit also serves as the starting unit when voltage is supplied directly from battery 48 by a manual start button 52. This manual process allows the rotational speed to ramp up to RPM's that allow the gains of inertia and momentum to sustain the rotational speed necessary for the motor to continue the run process. Gear box 36 connects upper and lower rotational blade units operating independently from one another but allowing power to the same common shaft 12 and generator 50/start—or battery 48 charging. Battery 48 supply voltage and current can be derived from various DC battery combinations or size. Electronic Ignition Distributor systems 46 are manufactured by several different companies such as Texas Instrument and are easily configured to this specific use by anyone skilled in the art.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A magnetic kinetic propulsion motor apparatus comprising;
   a. a shaft;
   b. a first two ended rotational blade attached at a midpoint of said two ended rotational blade to said shaft;
   c. a proximity magnetic sensor at both ends of said two ended rotational blade;
   d. a stationary housing surrounding said shaft and said first two ended rotational blade;
   e. a plurality of self-aligning repulsion electro-magnets connected to said stationary housing wherein said plurality of self-aligning repulsion electro-magnets include a non-magnetic housing, a plurality of wire wrapped iron rods are located, within said non-magnetic housing in spaced apart relation wherein said plurality of wire wrapped iron rods, surround a center cavity within said non-magnetic housing, and a magnetic square rod is located within said center cavity wherein said magnetic square rod is free to move to align with magnetic forces;
   f. a proximity switch located on each of said plurality of self-aligning repulsion electro-magnets;
   g. an electronic ignition distributor connected to each proximity switch located on said plurality of self-aligning repulsion electro-magnets;
   h. a battery connected to said electronic ignition distributor; and
   i. a generator connected to said shaft, said electronic ignition distributor and said battery wherein in response to said proximity magnetic sensor on the ends of said first two ended rotational blade being in proximity to and detected by a proximity switch located on a self-aligning repulsion electro-magnet such that said electronic ignition distributer sends power to said self-aligning repulsion electro-magnet which generates repulsive magnetic force on said proximity magnetic sensor at the ends of said first two ended rotational blade.

2. The apparatus of claim 1 further including a second two ended rotational blade connected at a midpoint of said second two ended rotational blade to said shaft and at right angle to said first two ended rotational blade wherein a proximity magnetic sensor is connected at both ends of said second two ended rotational blade.

3. The apparatus of claim 1 wherein there are seven wire wrapped iron rods in said non-magnetic housing.

4. The apparatus, of claim 1 further including a gear box connected to said shaft and a lower two ended rotational blade attached at a midpoint of said lower two ended rotational blade to said shaft such that said gear box is between said first two ended rotational blade and said lower two ended rotational blade.

5. The apparatus of claim 4 wherein said gear box reverses the direction of the lower two ended rotational blade in relation to said first two ended rotational blade.

6. The apparatus of claim 1 wherein said housing is circular such that each of said plurality of self-aligning repulsion electro-magnets is equidistant from said shaft.

7. The apparatus of claim 1 further including a mounting post connected with said stationary housing.

8. The apparatus of claim 1 wherein said housing includes two open ends.

9. A magnetic kinetic propulsion motor apparatus comprising:
   a. a shaft;
   b. a first two ended rotational blade attached at a midpoint, of said two ended rotational blade to said, shaft;
   c. a proximity magnetic sensor at both ends of said two ended rotational blade;
   d. a stationary housing surrounding said shaft and said first two ended rotational blade wherein said housing is circular;
   e. a plurality of self-aligning repulsion electro-magnets connected to said stationary housing such that each of said plurality of self-aligning repulsion electro-magnets is equidistant from said shaft wherein said plurality of self-aligning repulsion electro-magnets include a non-magnetic housing, a plurality of wire wrapped iron rods are located within said non-magnetic housing in spaced apart relation wherein said plurality of wire wrapped iron rods surround a center cavity within said non-magnetic housing, and a magnetic square rod is located within said center cavity wherein said magnetic square rod is free to move to align with magnetic forces;
   f. a proximity switch located on each of said plurality of self-aligning repulsion electro-magnets;
   g. an electronic ignition distributor connected to each proximity switch located on said plurality of self-aligning repulsion electro-magnets;
   h. a battery connected to said electronic ignition distributor;
   i. a generator connected to said shaft, said electronic ignition distributor and said battery where response to said proximity magnetic sensor on the ends of said first two ended rotational blade being in proximity to and detected by a proximity switch located on a self-aligning repulsion electro-magnet such that said electronic ignition distributer sends power to said self-aligning repulsion electro-magnet which generates repulsive magnetic force on said proximity magnetic sensor at the ends of said first two ended rotational blade; and
   j. a gear box connected to said shaft and lower two ended rotational blade attached at a midpoint of said lower two ended rotational blade to said shaft such that said gear box is between said first two ended rotational blade and said lower two ended rotational blade.

10. The apparatus of claim 9 further including a second two ended rotational blade connected at a midpoint of said second two ended rotational blade to said shaft and at right angle to said first two ended rotational blade wherein a proximity magnetic sensor is connected at both ends of said second two ended rotational blade.

11. The apparatus claim 10 wherein there are seven wire wrapped iron rods in said housing.

12. The apparatus of claim 9 wherein said gear box reverses the direction of the lower ended rotational blade in relation t said first two ended rotational blade.

13. The apparatus of claim 9 wherein said housing includes two open ends.

14. The apparatus of claim 9 further including a mounting post connected with said station housing.

15. That apparatus of claim 9 wherein there are thirty-six equally spaced self-aligning repulsion electro-magnets connected to said stationary housing.

16. A magnetic kinetic propulsion motor method comprising;

a. providing a shaft; a first two ended rotational blade attached at a midnight of said two ended rotational blade to said shaft; a proximity magnetic sensor at both ends of said two ended rotational blade; a stationary housing surrounding said shaft and said first two ended rotational blade; a plurality of self-aligning repulsion electro-magnets connected to said stationary housing wherein said plurality of self-aligning repulsion electro-magnets include a non-magnetic housing, in spaced apart relations wherein said plurality of wire wrapped iron rods surround a center cavity within said non-magnetic housing, and a magnetic square rod is located within said center cavity wherein said magnetic square rod is free to move to align with magnetic forces; a proximity switch located on each of said plurality of self-aligning repulsion electro-magnets; an electronic ignition distributor connected to each proximity switch located on said plurality of self-aligning repulsion electro-magnets; a battery connected to said electronic ignition distributor; and a generator connected to said shaft, said electronic ignition distributor and said battery wherein in response to said proximity magnetic sensor on the ends of said first two ended rotational blade being in proximity to and detected by a proximity switch located on a self-aligning repulsion electro-magnet such that said electronic ignition distributer sends power to said self-aligning repulsion electro-magnet which generates repulsive magnetic force on said proximity magnetic sensor at the ends of said first two ended rotational blade; and b. operating said battery to power said electronic ignition distributer.

17. The method of claim 16 further including a second two ended rotational blade connected at a midpoint of said second two ended rotational blade to said shaft and at right angle to said first two ended rotational blade wherein a proximity magnetic sensor is connected at both ends of said second two ended rotational blade.

18. The method of claim 16 further including a gear box connected to said shaft and a lower two ended rotational blade attached at a midpoint of said lower two ended rotational blade to said shaft such that said gear box is between said first two ended rotational blade and said lower two ended rotational blade.

\* \* \* \* \*

UNITED STATES PATENT AND TRADEMARK OFFICE
CERTIFICATE OF CORRECTION

PATENT NO. : 9,997,979 B1
APPLICATION NO. : 14/645019
DATED : June 12, 2018
INVENTOR(S) : Roy Lee Garrison and Charles Paul McNemar It is certified that error appears in the above-identified patent and that said Letters Patent is hereby corrected as shown below:

In the Claims

In Claim 1e, Column 9, Line 29: "a plurality of wire wrapped iron rods are located, within said non-magnetic housing" should read --a plurality of wire wrapped iron rods are located within said non-magnetic housing--.

In Claim 1e, Column 9, Line 31: "wherein said plurality of wire wrapped iron rods, surround a center cavity within said non-magnetic housing" should read --wherein said plurality of wire wrapped iron rods surround a center cavity within said non-magnetic housing--.

In Claim 9i, Column 10, Line 42: "said electronic ignition distributor and said battery where response to said proximity magnetic sensor on the ends of said first two ended rotational blade" should read --said electronic ignition distributor and said battery wherein response to said proximity magnetic sensor on the ends of said first two ended rotational blade--.

In Claim 9j, Column 10, Line 52: "a gear box connected to said shaft and lower two ended rotational blade" should read --a gear box connected to said shaft and a lower two ended rotational blade--.

In Claim 12, Column 10, Line 65: "The apparatus of claim 9 wherein said gear box reverses the direction of the lower ended rotational blade" should read --The apparatus of claim 9 wherein said gear box reverses the direction of the lower two ended rotational blade--.

In Claim 12, Column 10, Line 67: "rotatational blade in relation t said two ended rotational blade" should read --rotational blade in relation to said first two ended rotational blade.--.

In Claim 14, Column 11, Line 4: "The apparatus of claim 9 further including a mounting post connected with said station housing." should read --The apparatus of claim 9 further including a mounting post connected with said stationary housing.--.

Signed and Sealed this
Thirtieth Day of October, 2018

Andrei Iancu
*Director of the United States Patent and Trademark Office*

CERTIFICATE OF CORRECTION (continued)
U.S. Pat. No. 9,997,979 B1

In Claim 16a, Column 11, Line 11: "providing a shaft; a first two ended rotational blade attached at a midnight of said two ended rotational blade" should read --providing a shaft; a first two ended rotational blade attached at a midpoint of said two ended rotational blade--.

In Claim 16a, Column 11, Line 19: "a non-magnetic housing in spaced apart relations" should read --a non-magnetic housing, a plurality of wire wrapped iron rods are located within said non-magnetic housing in spaced apart relation--.